(12) United States Patent
Wang et al.

(10) Patent No.: US 12,120,587 B2
(45) Date of Patent: Oct. 15, 2024

(54) METHOD, APPARATUS, AND NON-TRANSITORY COMPUTER READABLE MEDIUM FOR INDOOR POSITIONING

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Ke Wang, Shenzhen (CN); Sheng-Fu Ding, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 406 days.

(21) Appl. No.: 17/585,880

(22) Filed: Jan. 27, 2022

(65) Prior Publication Data
US 2023/0140086 A1 May 4, 2023

(30) Foreign Application Priority Data
Oct. 28, 2021 (CN) .......................... 202111265106.0

(51) Int. Cl.
*H04W 4/33* (2018.01)
*G01S 5/00* (2006.01)
*H04W 4/02* (2018.01)
*H04W 4/029* (2018.01)

(52) U.S. Cl.
CPC ............. *H04W 4/33* (2018.02); *G01S 5/0027* (2013.01); *G01S 5/013* (2020.05); *H04W 4/023* (2013.01); *H04W 4/029* (2018.02)

(58) Field of Classification Search
CPC ......... H04W 4/33; H04W 4/029; G01S 5/013; G01S 5/0027

USPC ....................................................... 455/456.1
See application file for complete search history.

(56) References Cited

U.S. PATENT DOCUMENTS

| | | | |
|---|---|---|---|
| 8,965,412 B2 * | 2/2015 | Alizadeh-Shabdiz | ...................... G01S 19/13 455/456.6 |
| 10,015,627 B1 * | 7/2018 | Mossey | ............... H04W 64/003 |
| 10,984,146 B2 * | 4/2021 | Santarone | .............. G16H 50/80 |
| 11,140,651 B2 * | 10/2021 | Ayyalasomayajula | ...................... H04L 25/0216 |
| 11,194,938 B2 * | 12/2021 | Kincart | .................. G06Q 10/08 |

(Continued)

OTHER PUBLICATIONS

Survey of Wireless Indoor Positioning Techniques and Systems (Year: 2007).*

(Continued)

*Primary Examiner* — Chuck Huynh
(74) *Attorney, Agent, or Firm* — ScienBiziP, P.C.

(57) ABSTRACT

A method for indoor positioning includes obtaining a WI-FI positioning result of an apparatus, the WI-FI positioning result comprising first position information of the apparatus; determining at least three base stations according to the WI-FI positioning result; determining a base station positioning result of the apparatus according to the at least three base stations, the base station positioning result comprising second position information of the apparatus; and determining an actual position of the apparatus according to the first position information and the second position information. An apparatus and a non-transitory computer readable medium comprising the method of establishing a precise indoor positioning of the apparatus are also disclosed.

15 Claims, 13 Drawing Sheets

(56) References Cited

U.S. PATENT DOCUMENTS

| | | | |
|---|---|---|---|
| 2007/0096898 A1* | 5/2007 | Chou | H04W 4/02 340/539.13 |
| 2013/0045759 A1* | 2/2013 | Smith | G01S 5/0264 455/456.6 |
| 2014/0011516 A1* | 1/2014 | Ji | H04W 64/00 455/456.1 |
| 2014/0018095 A1* | 1/2014 | Parvizi | H04W 4/025 455/456.1 |
| 2015/0072714 A1* | 3/2015 | Froehlich | H04W 4/023 455/457 |
| 2015/0256972 A1* | 9/2015 | Markhovsky | G01S 5/0273 455/456.1 |
| 2015/0309180 A1* | 10/2015 | Jiang | G01C 21/206 701/468 |
| 2016/0100290 A1* | 4/2016 | Smith | H04W 64/00 455/456.1 |
| 2016/0103201 A1* | 4/2016 | Lee | G01S 5/0036 455/456.1 |
| 2016/0131733 A1* | 5/2016 | Do | G01S 5/0226 342/378 |
| 2016/0255471 A1* | 9/2016 | Marri Sridhar | H04B 17/318 455/456.2 |
| 2016/0302032 A1* | 10/2016 | Chesnutt | G01S 5/0221 |
| 2017/0086024 A1* | 3/2017 | Do | H04W 74/002 |
| 2017/0155572 A1* | 6/2017 | Ge | G06T 5/50 |
| 2017/0238146 A1* | 8/2017 | Kulig | H04W 4/029 455/456.1 |
| 2018/0063680 A1* | 3/2018 | Bitra | G01S 5/02521 |
| 2018/0067187 A1* | 3/2018 | Oh | H04W 64/00 |
| 2018/0249290 A1* | 8/2018 | Ivanov | G06T 17/05 |
| 2018/0288569 A1* | 10/2018 | Wang | G01S 1/0426 |
| 2018/0321353 A1* | 11/2018 | Patel | G01C 21/1654 |
| 2019/0166574 A1* | 5/2019 | Abou-Rizk | H04W 16/00 |
| 2019/0219403 A1* | 7/2019 | Hu | G01S 5/02521 |
| 2020/0021024 A1* | 1/2020 | Park | H04B 1/0475 |
| 2020/0209372 A1* | 7/2020 | Seth | H04B 17/309 |
| 2021/0058740 A1* | 2/2021 | He | G01S 3/20 |
| 2022/0272504 A1* | 8/2022 | Hága | G01S 5/0244 |

OTHER PUBLICATIONS

A Survey of Indoor Localization Systems and Technologies (Year: 2019).*

* cited by examiner

METHOD, APPARATUS, AND NON-TRANSITORY COMPUTER READABLE MEDIUM FOR INDOOR POSITIONING

CROSS-REFERENCE TO RELATED APPLICATIONS

This application claims priority to China Patent Application No. 202111265106.0 filed on Oct. 28, 2021, the contents of which are incorporated by reference herein.

FIELD

The subject matter herein generally relates to positioning technology, and particularly to a method, an apparatus, and a non-transitory computer readable medium for indoor positioning.

BACKGROUND

Establishing positioning by ultra wideband (UWB) frequencies is high precision, but the apparatus for indoor positioning using UWB is expensive, which is hard to be widely used. Wireless-Fidelity (WI-FI) positioning is cheaper and easier to use, but has lower positioning precision. BLUETOOTH positioning uses less power, has small size, and fast connecting time, but is low in stability and easily affected by noise, which may cause unstable positioning results.

Thus, high positioning precision in indoor positioning is hard to achieve and has high cost. Therefore, there is still room for improving the indoor positioning technology.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
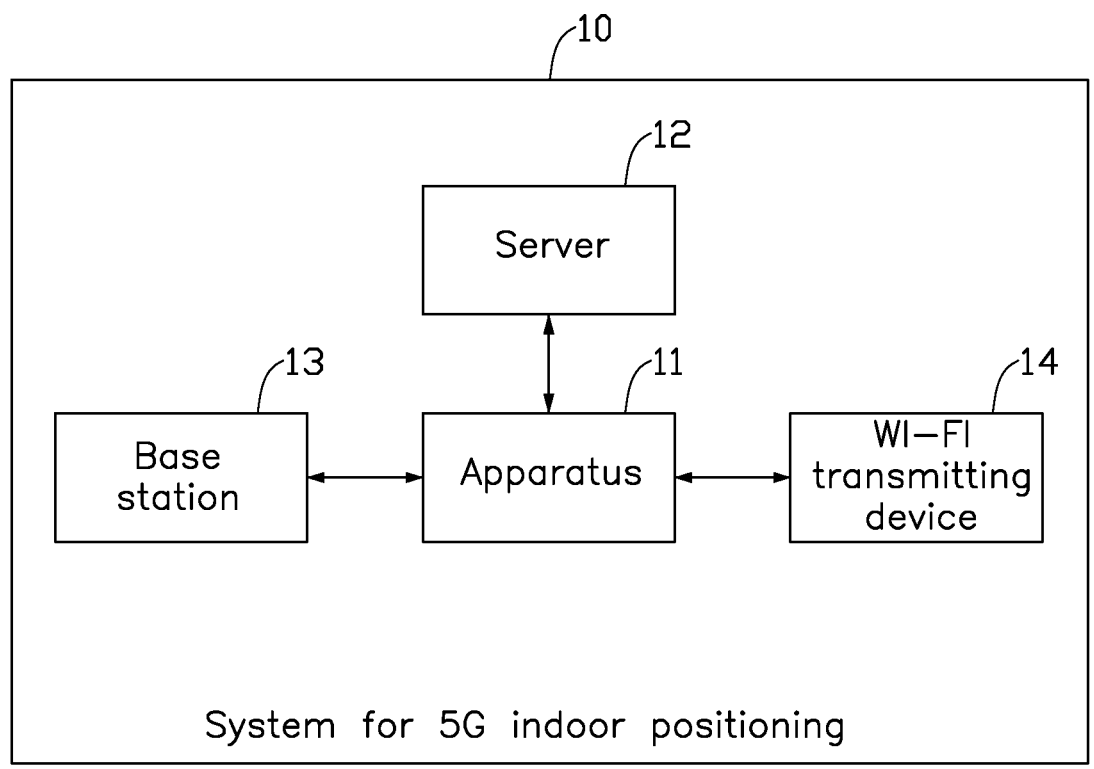
FIG. 1 illustrates a schematic view of at least one embodiment of a system for 5G indoor positioning.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

The present disclosure provides a method for indoor positioning applied in a system for indoor positioning using 5th generation (5G) mobile communication technology.

The present disclosure takes 5G as an example, in other embodiments, communication technologies such as LTE, 3G, etc. are also applicable.

FIG. 1 illustrates a system 10 for 5G indoor positioning which improves indoor siting and positioning precision of an apparatus with low positioning cost. The system 10 includes an apparatus 11, a server 12, a base station 13, and a WI-FI transmitting device 14. The apparatus 11 is in communication with the server 12, the base station 13, and the WI-FI transmitting device 14.

The apparatus 11 can be any electronic device supporting 5G communication, such as personal computers, tablet computers, smart phones, personal digital assistants (PDAs), wearable devices, etc.

The server 12 may be a cloud server and one or more server apparatus arranged indoor. The server 12 may store location information of several WI-FI transmitting devices 14 indoors, and base station information of several 5G base stations near the building.

The base station 13 may include various 5G base stations, such as macro sites, microcells, relay stations, access points, etc.

The WI-FI transmitting device 14 may be an apparatus that can transmit wireless WI-FI signals, such as routers, WI-FI transmitter, etc.

In at least one embodiment, the WI-FI transmitting devices 14 and the base station 13 are at fixed locations, the location information thereof is stored in the server 12. When the apparatus 11 operates a WI-FI positioning, since locations of the WI-FI transmitting devices 14 are known, so determining geometrical distances among the WI-FI transmitting devices 14 and calculating a present location of the apparatus 11 relative to the WI-FI transmitting devices 14 based on the geometrical distances. However, since WI-FI signals may be unstable, WI-FI positioning results may include some errors.

When the apparatus 11 operates a base station positioning, since locations of the base stations 13 are known, so determining geometrical distances among the base stations 13 and calculating a present location of the apparatus 11 relative to the base stations 13 based on the geometrical distances can be easily determined. However, since the apparatus 11 is indoors, the location calculated may be imprecise, causing errors in the base station positioning results.

Based on the problems above, a method for indoor position is provided, providing a WI-FI positioning result of the apparatus 11 by the WI-FI transmitting device 14, determining at least three base stations 13 according to the WI-FI positioning result, determining a base station positioning result of the apparatus 11 according to the at least three base stations 13, and determining an actual position of the apparatus 11 according to the WI-FI positioning result and the base station positioning result. Through a combination of the WI-FI positioning and the base station positioning, precision of indoor positioning of the apparatus 11 is improved, without any additional positioning apparatus.

Figure 2:
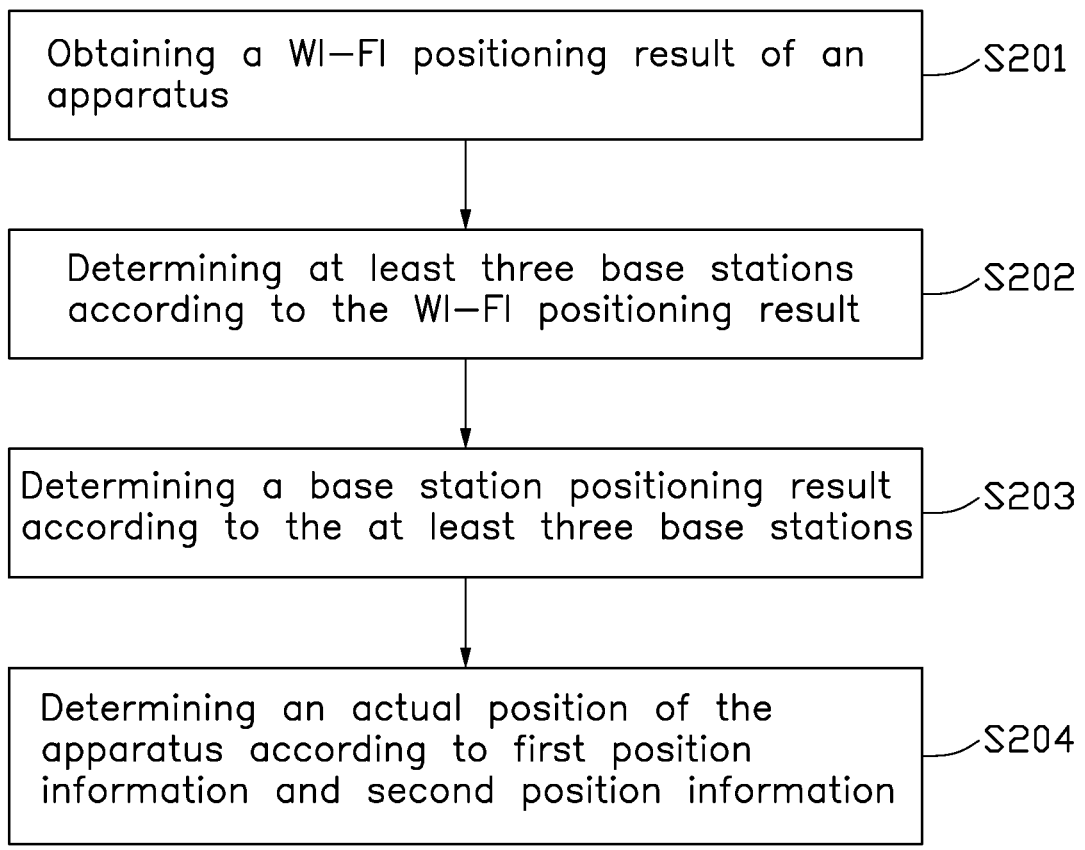
FIG. 2 is a first flowchart of at least one embodiment of a method for indoor positioning.

FIG. 2 illustrates a flowchart of at least one embodiment of a method for indoor positioning.

In at least one embodiment, the method for indoor positioning may be applied in a system, such as the system 10 for 5G indoor positioning shown in FIG. 1. The functions may be integrated in the apparatus 11 for the method for indoor positioning. In another embodiment, the method for indoor positioning can be run in a form of software development kit in the apparatus 11.

The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S201.

At block S201, obtaining a WI-FI positioning result of an apparatus.

In at least one embodiment, the WI-FI positioning result includes first position information of the apparatus. The first position information may be position information of position points of the WI-FI positioning result, or position information of an area formed by the position points of the WI-FI positioning result.

In at least one embodiment, the WI-FI positioning result may be obtained by the WI-FI transmitting devices 14 arranged indoors, the WI-FI positioning result may be shown with longitude and latitude.

The WI-FI positioning may be any WI-FI positioning technologies. The apparatus obtains position information, a transmitting power, and a transmitting frequency of three WI-FI transmitting devices indoor from the server. The apparatus sets a central point of the building as an original point, and regards a longitude as an X-axis and a latitude as a Y-axis, so as to establish a two-dimensional coordinate system.

Figure 3:
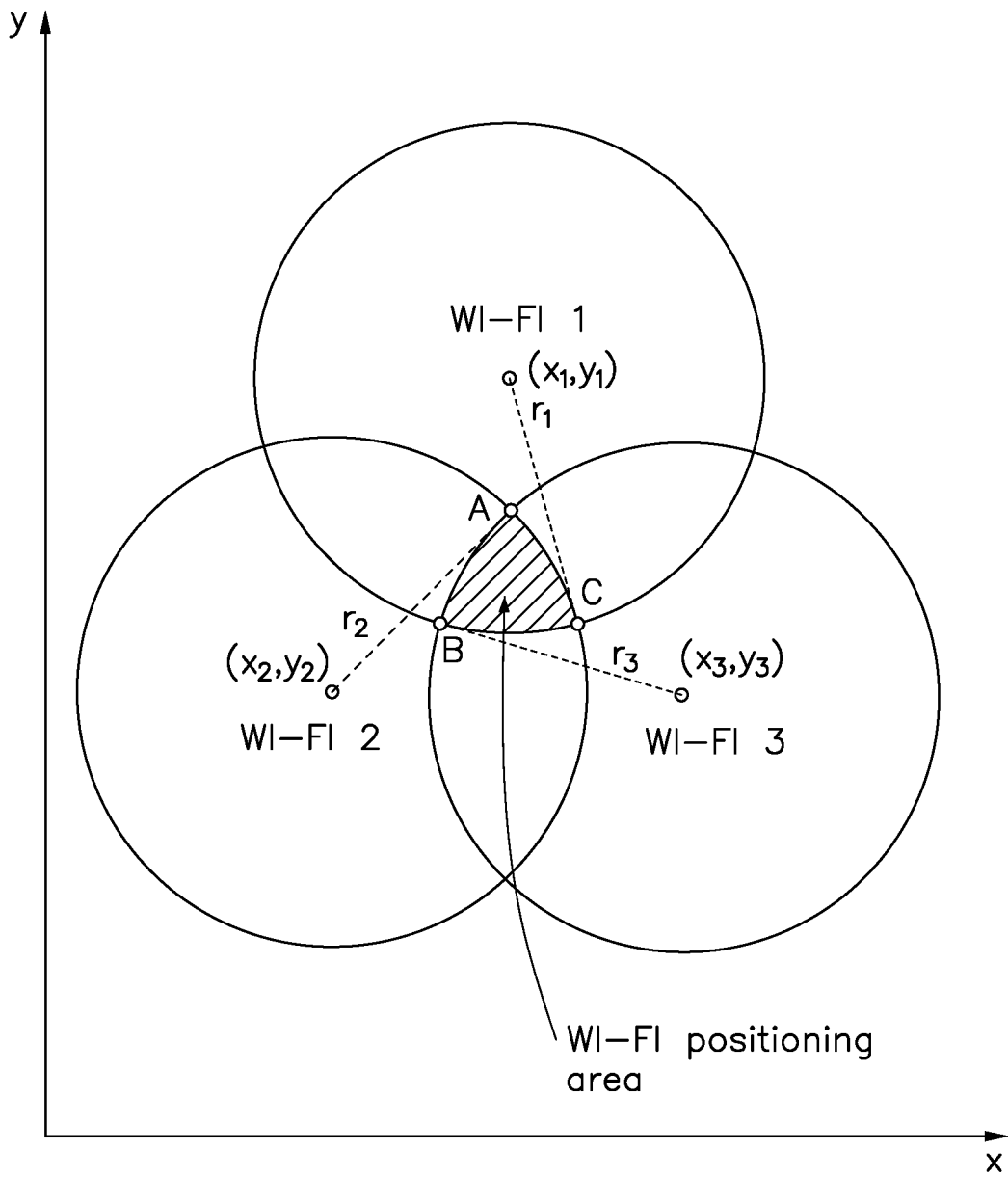
FIG. 3 illustrates a schematic view of at least one embodiment of WI-FI positioning results.

For instance, referring to FIG. 3, in the two-dimensional coordinate system of the apparatus, a position coordinate of a first WI-FI transmitting device may be (x1, y1), a transmitting power P1=3 dBm; a position coordinate of a second WI-FI transmitting device may be (x2, y2), a transmitting power P2-6 dBm. A position coordinate of a third WI-FI transmitting device may be (x3, y3), a transmitting power P3-9 dBm; a transmitting frequency of the WI-FI transmitting devices is 2400 MHz.

The apparatus determines received signal strength indication (RSSI) from the three WI-FI transmitting devices, such as RSSI-1=−65 dBm, RSSI-2=−60 dBm, RSSI-3=−55 dBm. RSSI-1 is a received signal strength indication of the apparatus from the first WI-FI transmitting device, RSSI-2 is a received signal strength indication of the apparatus from the second WI-FI transmitting device, and RSSI-3 is a received signal strength indication of the apparatus from the third WI-FI transmitting device.

In at least one embodiment, the RSSI indicates a broadband received power of a channel bandwidth received by the apparatus with a unit of dBm, a value of the RSSI is a relative value, which is relative to a quality of an antenna of the apparatus, blockages and shelters or covers in surrounding environment, and distances to the signal transmitting source.

The apparatus, according to the RSSI and the transmitting power of the WI-FI transmitting device, calculates three propagation loss values (indicated by Lbs) of free space electric waves, such as Lbs1=P1−RSSI1=68d, Lbs2=P2−RSSI2=66 dB, Lbs3=P3−RSSI3=64 dB.

The apparatus, according to a free space electric waves propagation loss model, determines distances between the apparatus and the three WI-FI transmitting devices. In detail, the free space electric waves propagation loss model is Lbs=32.45+20lgF (MHz)+20lgr (km). Lbs indicates propagation loss values of free space electric waves, F indicates a transmitting frequency, r indicates a propagation distance. $r1=10^{(Lbs1-32.45-20lg2400)/20}=10^{(68-32.45-20lg2400)/20}=24.96m$; $r2=10^{(Lbs2-32.45-20lg2400)/20}=10^{(66-32.45-20lg2400)/20}=19.83m$; $r3=10^{(Lbs3-32.45-20lg2400)/20}=10^{(64-32.45-20lg2400)/20}=15.75m$.

The apparatus substitutes the propagation distances and the position coordinate of the WI-FI transmitting device corresponding to the propagation distances into a predetermined equation $r=(x-x_0)^2+(y-y_0)^2$, to obtain an equation set:

$$r_1=\sqrt{(x-x_1)^2+(y-y_1)^2};$$

$$r_2=\sqrt{(x-x_2)^2+(y-y_2)^2};$$

$$r_3=\sqrt{(x-x_3)^2+(y-y_3)^2};$$

The apparatus, according to the equation set, calculates three positioning coordinates (Fx1, Fy1), (Fx2, Fy2), (Fx3, Fy3), which are the WI-FI positioning results and may be stored in the memory.

FIG. 3 illustrates a schematic view of at least one embodiment of the WI-FI positioning results. In the two-dimensional coordinate system (the longitude is corresponding to the X-axis, the latitude is corresponding to the Y-axis, or vice versa; the corresponding axis may be equal proportion or same proportion, such as 1:1), the coordinates of the three WI-FI transmitting devices and the distances between the apparatus and the three WI-FI transmitting devices are substituted into the equation set, and three circular areas are obtained as shown in FIG. 3 (one circular area is corresponding to a positioning range of one WI-FI transmitting device). Based on the three circular areas, determining three points of intersection A, B, C (three points positioned by the WI-FI positioning), an area surrounded by the points of intersection A, B, and C is a WI-FI positioning area.

For instance, three positioning coordinates are (2, 3), (4, 5), (3, 7) based on the WI-FI positioning, the WI-FI positioning area is (X1=2, X2=4, Y1=3, Y2=7), X1 and X2 are threshold values of a coordinate range of the X-axis, Y1 and Y2 are threshold values of a coordinate range of the Y-axis, the WI-FI positioning area is an area surrounded by coordinates 2 and 4 of the X-axis, and coordinates 3 and 7 of the Y-axis in the three circular areas.

In at least one embodiment, the apparatus acquires the WI-FI positioning result of the apparatus from the memory.

The WI-FI positioning result of the apparatus may be imprecise, but showing a substantial position of the apparatus.

At block S202, determining at least three base stations according to the WI-FI positioning result.

In at least one embodiment, the apparatus determines a position coordinate of the apparatus to be positioned according to the WI-FI positioning result, and selects at least three base stations nearest to the position coordinate.

A position coordinate of a central point of the WI-FI positioning area is regarded as a reference value, so as to determine the at least three base stations nearest to the position coordinate of the central point.

At block S203, determining a base station positioning result according to the at least three base stations.

The base station positioning result includes second position information of the apparatus, the second position information may be a plurality of position coordinates, an area, or a central point of an area.

After determining the at least three base stations, the apparatus determines the base station positioning result by any base station positioning technologies.

The base station positioning is applied by the base stations determined by the WI-FI positioning result. Since the base stations are the closest base stations to the apparatus, the base station positioning result is more precise.

At block S204, determining an actual position of the apparatus according to the first position information and the second position information.

Selectively, the first position information may be an area, the second position information may also be an area. The apparatus determines two central points of the two areas and determines the actual position of the apparatus as being the middle point of a line connecting the two central points. For instance, the central point of the first position information is (3, 5), the central point of the second position information is (9, 7), so the actual position is the middle point of two coordinate points ((3+9)/2, (5+7)/2).

Selectively, the first position information may be several coordinate points, the second position information may also be several coordinate points. The apparatus determines a central point of the several coordinate points of the first position information and a central point of the several coordinate points of the second position information, and selects a suitable coordinate point of the second position information as the actual position of the apparatus. For instance, selecting one coordinate point from the central point or several coordinate points of the second position information nearest to the central point of the first position information as being the actual position of the apparatus.

Selectively, the first position information may be a coordinate point, the second position information may be several coordinate points. The apparatus determines the coordinate point of the first position information as a reference, and selects a suitable coordinate point of the several coordinate points of the second position information as the actual position of the apparatus. For instance, selecting a coordinate point from the several coordinate points of the second position information nearest to the coordinate point of the first position information as being the actual position of the apparatus.

Figure 4:
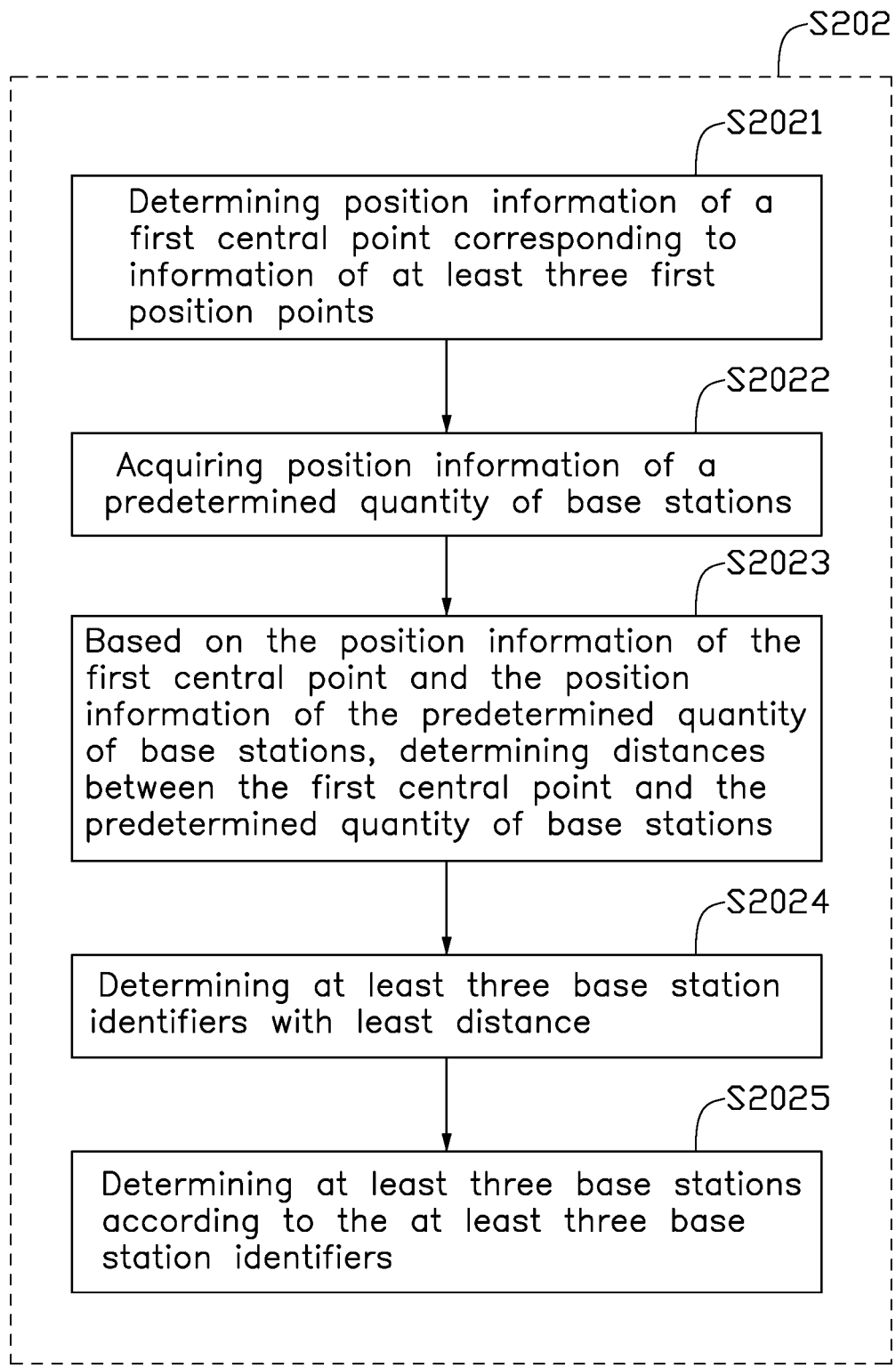
FIG. 4 is a second flowchart of at least one embodiment of the method for indoor positioning.

In at least one embodiment, the first position information may include information of at least three first position points for determining at least three base stations. As shown in FIG. 4, block S202 further includes blocks S2021-S2025.

At block S2021, determining position information of a first central point corresponding to information of at least three first position points.

In at least one embodiment, the apparatus calculates average coordinate point information according to the information of at least three first position points, and determines the average coordinate point information as the first central point.

For instance, the apparatus, based on the information of the three first position points obtained in block S201, corresponds to the two-dimensional coordinate system established by the apparatus to obtain (Fx1, Fy1), (Fx2, Fy2), (Fx3, Fy3); and corresponds to the first central point to obtain ((Fx1+Fx2+Fx3)/3, (Fy1+Fy2+Fy3)/3).

At block S2022, acquiring position information of a predetermined quantity of base stations.

The position information of the base stations includes a base station identifier and a position corresponding to the base station identifier. The base station identifier may be a base station ID, such as a hexadecimal number needing only 2 bytes.

In at least one embodiment, the server stores the position information of the base stations, the apparatus acquires the position information of the predetermined quantity of base stations from the server.

The predetermined quantity may be preset in the apparatus by operators, which may be three or more than three.

For instance, the apparatus acquires position information of four base stations corresponding to the two-dimensional coordinate system established by the apparatus, to obtain base station 1 (x4, y4), base station 2 (x5, y5), base station 3 (x6, y6), base station 4 (x7, y7).

At block S2023, based on the position information of the first central point and the position information of the predetermined quantity of base stations, determining distances between the first central point and the predetermined quantity of base stations.

In at least one embodiment, in the two-dimensional coordinate system of the apparatus, the apparatus calculates the distances between the first central point ((Fx1+Fx2+Fx3)/3, (Fy1+Fy2+Fy3)/3) and the predetermined quantity of base station coordinates according to a predetermined equation.

The predetermined equation may be a distance equation between two points in the two-dimensional coordinate system: $d=\sqrt{(x-x_0)^2+(y-y_0)^2}$. x means an x coordinate of the first central point, y means a y coordinate of the first central point, $x_0$ means an x coordinate of the base station, and $y_0$ means a y coordinate of the base station.

At block S2024, determining at least three base station identifiers with the least distance.

In at least one embodiment, the apparatus sorts the calculated predetermined quantity of distances from small to large, and determines the base station identifiers corresponding to at least three smallest distances.

At block S2025, determining at least three base stations according to the at least three base station identifiers.

Figure 5:
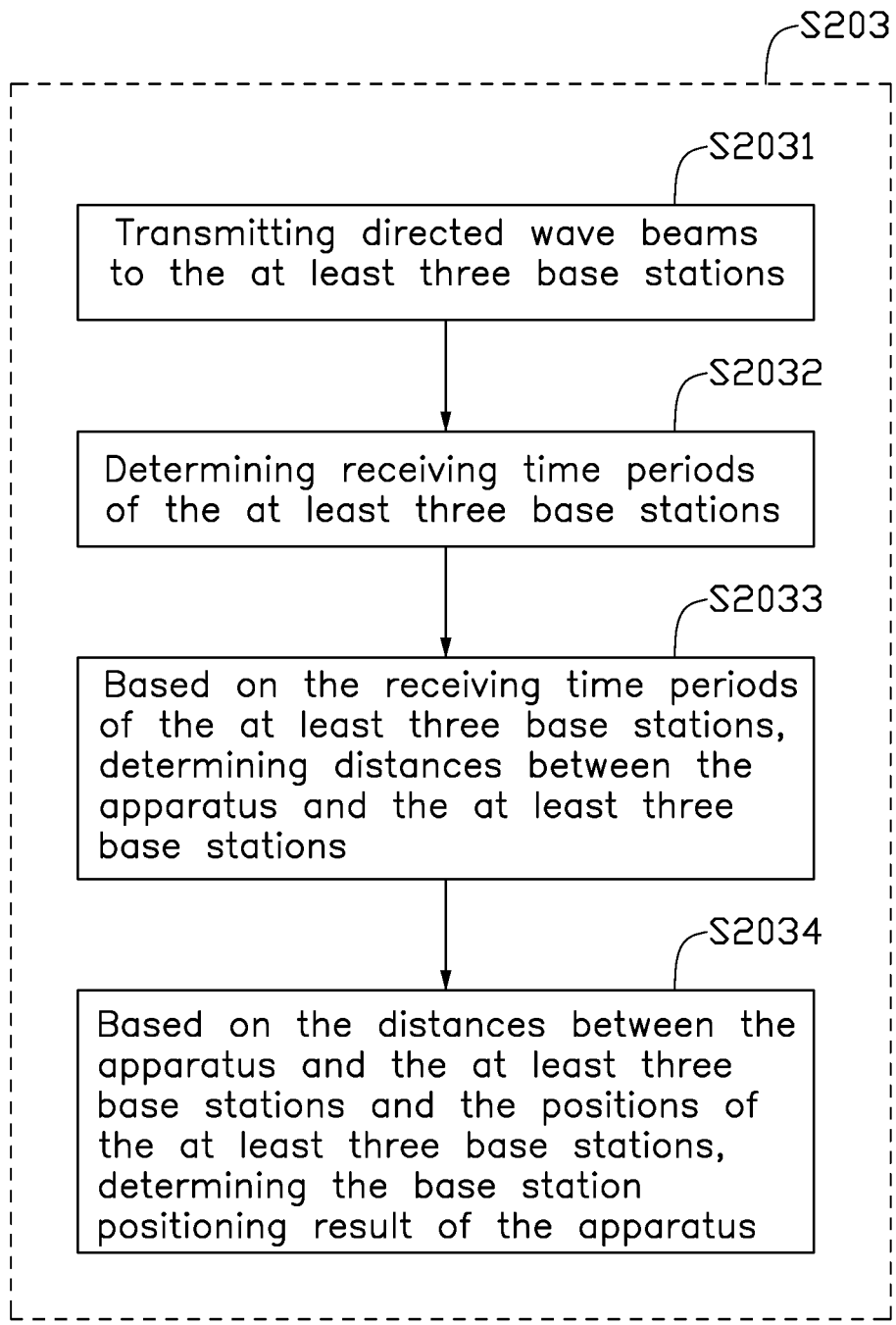
FIG. 5 is a third flowchart of at least one embodiment of the method for indoor positioning.

In at least one embodiment, for determining the base station positioning result of the apparatus, as shown in FIG. 5, block S203 further includes blocks S2031-S2034.

At block S2031, transmitting directed wave beams to the at least three base stations.

In at least one embodiment, a direction of an antenna of the apparatus may be adjusted, to transmit the directed wave beams to the at least three base stations.

Selectively, the directed wave beams may be 5G millimeter waves (MMWs).

At block S2032, determining receiving time periods of the at least three base stations.

In at least one embodiment, the apparatus may determine the receiving time periods of the at least three base stations according to point in time of each base station transmitting the directed wave beam and point in time of the corresponding base station receiving the directed wave beam.

At block S2033, based on the receiving time periods of the at least three base stations, determining distances between the apparatus and the at least three base stations.

The receiving time periods mean a transmitting time period of the directed wave beams transmitting from the apparatus to the base stations.

In at least one embodiment, the apparatus substitutes the receiving time periods of the at least three base stations into a predetermined equation d=c/t, to calculate the distances between the apparatus and the at least three base stations. d means a distance between the apparatus and one of the three base stations, c means a transmitting speed of the electromagnetic wave (known quantity, 3*108 m/s), and t means the receiving time period.

For instance, if the receiving time period t1=8*10-6s of a base station 1, the receiving time period t2=1.6*10-5s of a base station 2, and the receiving time period t3=2.5*10-5s of a base station 3, thus, a distance d1=c*t1=2400m between the apparatus and the base station 1, there is a distance d2=c*t2=4800m between the apparatus and the base station 2, and there is a distance d3=c*t3=7500m between the apparatus and the base station 3.

The effects of the apparatus being inside a building mean that the transmission of the electromagnetic wave may be affected, an error range of the transmitting time may be about 3.33*10-9s, an error range of the positioning may be about $c*3.33*10^{-9}=1m$. However, the error ranges are acceptable in actual use.

At block S2034, based on the distances between the apparatus and the at least three base stations and the positions of the at least three base stations, determining the base station positioning result of the apparatus.

In at least one embodiment, the apparatus substitutes the distances between the apparatus and the at least three base stations and the positions of the at least three base stations into a predetermined function, to calculate the base station positioning result of the apparatus. The predetermined function may be a function of positioning in the apparatus input by the operator. For instance, the predetermined function may be a function equation of the circle, three function equations of the circle may determine a position area.

Figure 6:
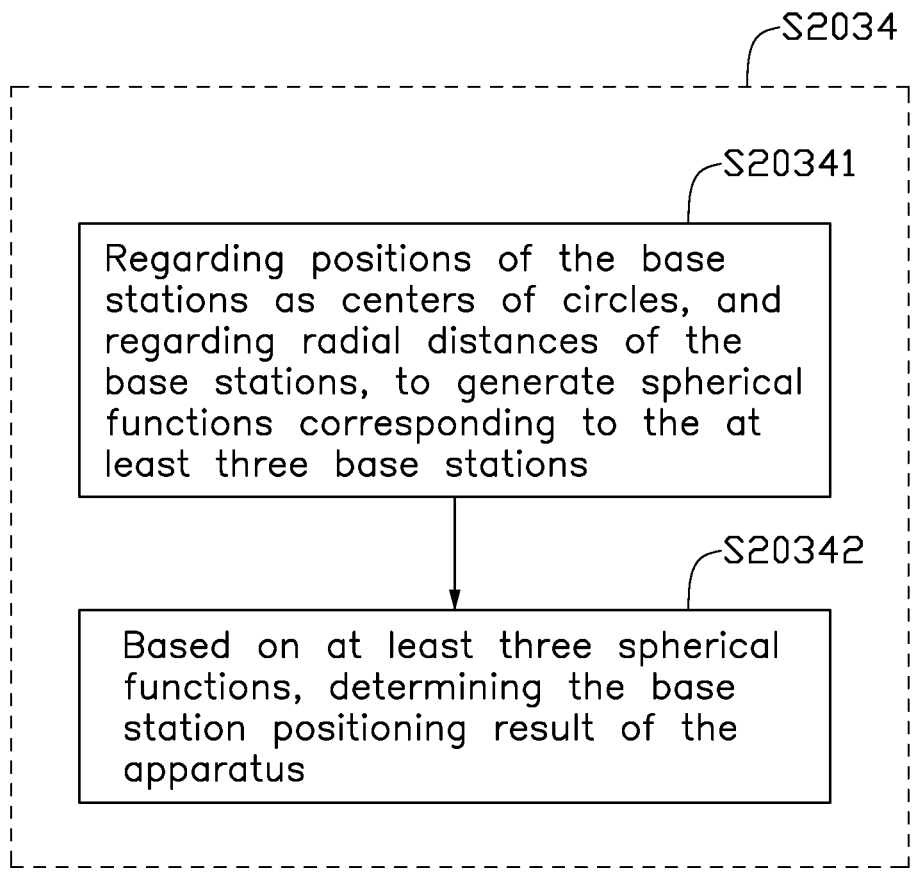
FIG. 6 is a fourth flowchart of at least one embodiment of the method for indoor positioning.

For determining the base station positioning result of the apparatus, as shown in FIG. 6, block S2034 further includes blocks S20341-S20342.

At block S20341, regarding positions of the base stations as centers of circles, and regarding radial distances of the base stations, to generate spherical functions corresponding to the at least three base stations.

For instance, in the two-dimensional coordinate system of the apparatus, the apparatus regards the base station 1 (x4, y4) as a coordinate of the center of the circle, the distance d1 between the apparatus and the base station 1 as a radius, to generate a first spherical function $d1=\sqrt{(x-x_4)^2+(y-y_4)^2}$; similarly, the apparatus generates a second spherical function $d_2=\sqrt{(x-x_5)^2+(y-y_5)^2}$ and a third spherical function $d_3=\sqrt{(x-x_6)^2+(y-y_6)^2}$.

At block S20342, based on at least three spherical functions, determining the base station positioning result of the apparatus.

In at least one embodiment, the apparatus calculates the at least three spherical functions, to obtain at least three coordinate values, and determines the at least three coordinate values as the base station positioning result of the apparatus.

For instance, the apparatus establishes an equation set with the three spherical functions, and calculates three coordinate values (Sx1, Sy1), (Sx2, Sy2), (Sx3, Sy3).

Figure 7:
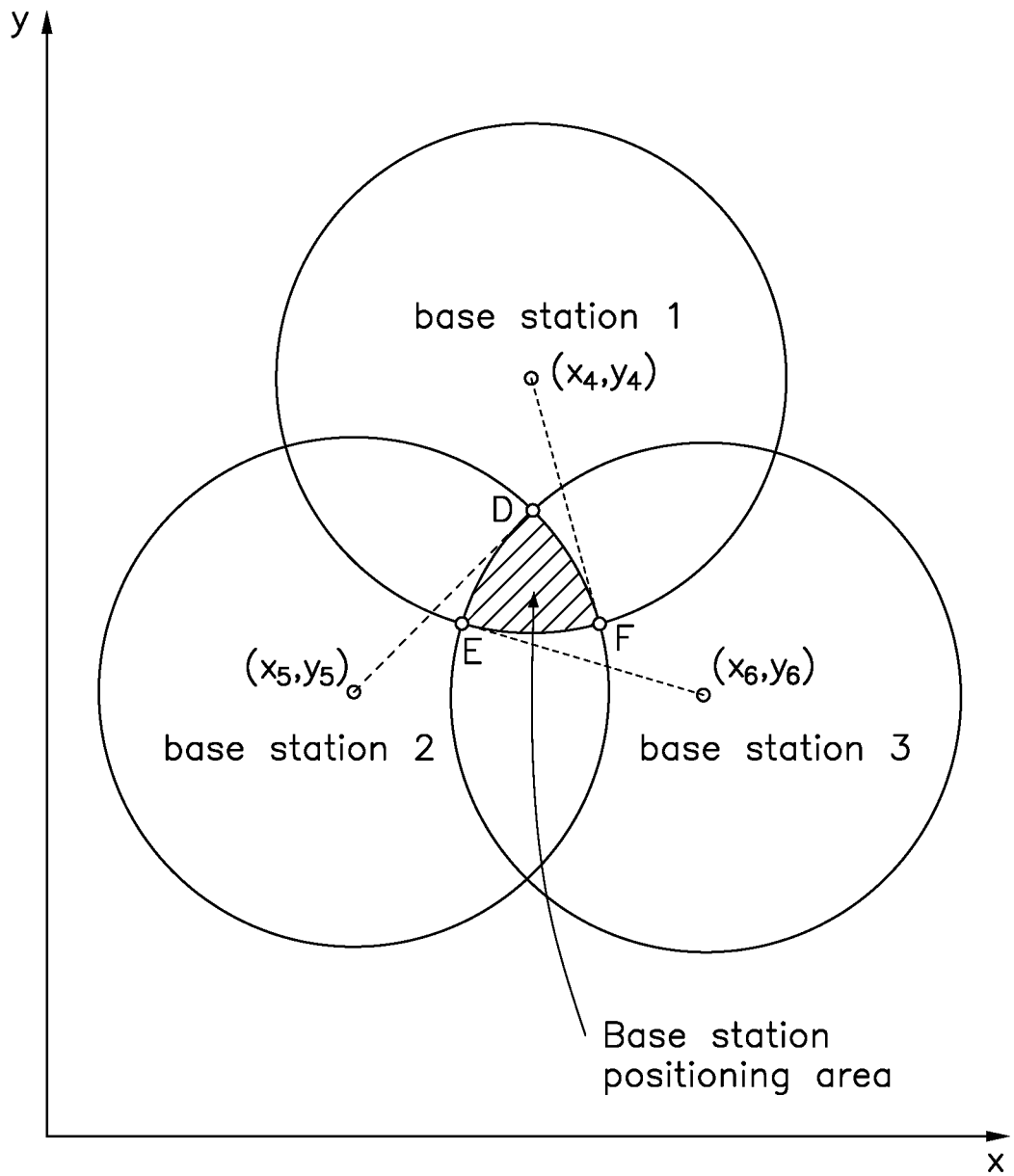
FIG. 7 illustrates a schematic view of at least one embodiment of base positioning results.

FIG. 7 illustrates a schematic view of at least one embodiment of a result of positioning calculations. In the two-dimensional coordinate system (same with the coordinate system as shown in FIG. 3), the position coordinate of the base station 1 is (x4, y4), the position coordinate of the base station 2 is (x5, y5), and the position coordinate of the base station 3 is (x6, y6). Substituting the position coordinates of the three base stations and the distances corresponding to the three base stations into the three spherical functions, so as to obtain three circular areas (one circular area is corresponding to a positioning range of a base station) as shown in FIG. 7. Based on three intersection points D, E, F (three points by the base station positioning) of the three circular areas, an area enclosed by the three intersection points D, E, F is a base station positioning area.

Figure 8:
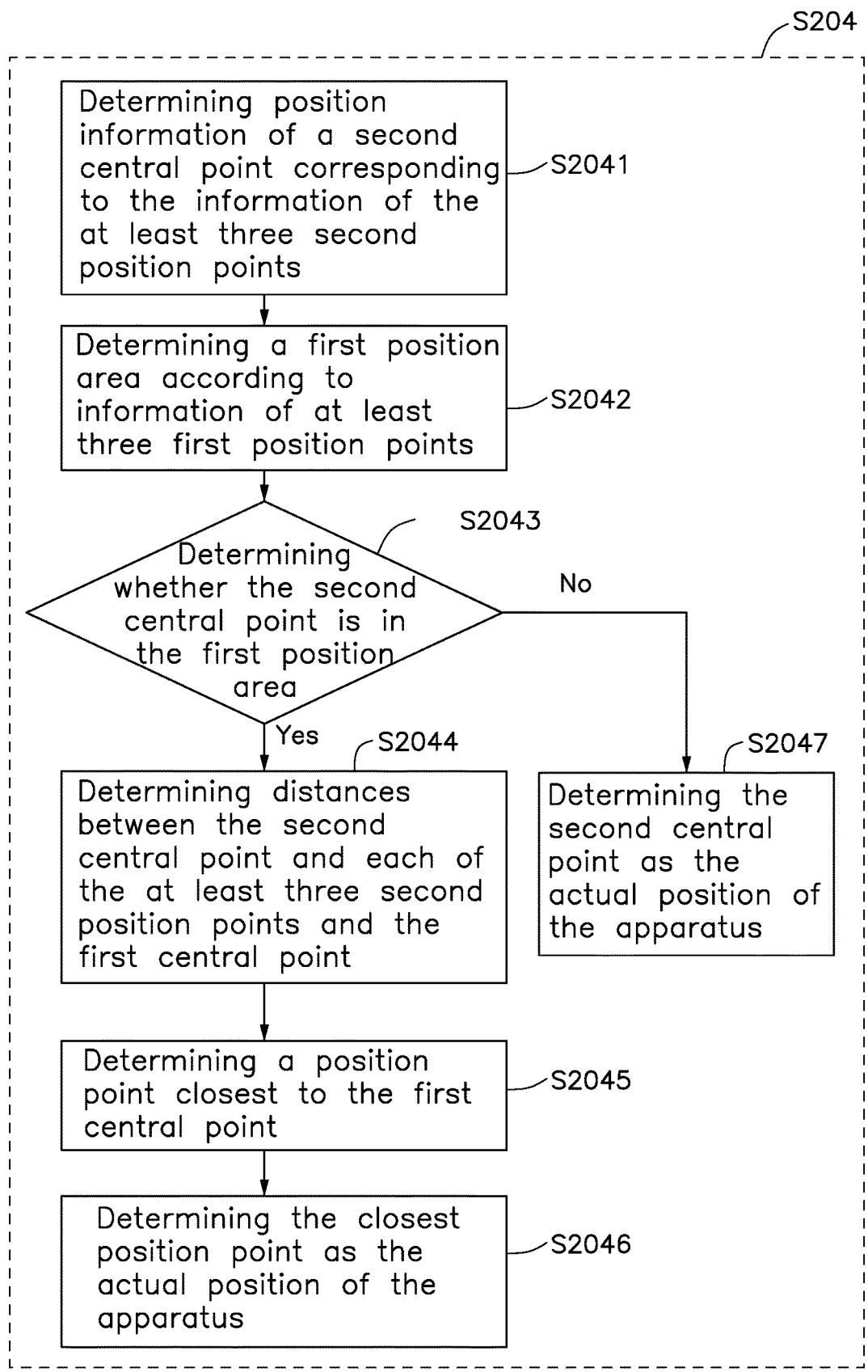
FIG. 8 is a fifth flowchart of at least one embodiment of the method for indoor positioning.

In at least one embodiment, the second position information includes information of at least three second position points, for determining the at least three base stations, as shown in FIG. 8, block S204 further includes blocks S2041-S2047.

At block S2041, determining position information of a second central point corresponding to the information of the at least three second position points.

In at least one embodiment, the apparatus calculates information of an average position point according to the information of the at least three second position points, and determines the calculated information of the average position point as the position information of the second central point.

For instance, the apparatus determines the information of the three second position points d according to block S20342, which are (Sx1, Sy1), (Sx2, Sy2), (Sx3, Sy3). Thus, the corresponding position information of the second central point is ((Sx1+Sx2+Sx3)/3, (Sy1+Sy2+Sy3)/3).

At block S2042, determining a first position area according to information of at least three first position points.

In at least one embodiment, in the two-dimensional coordinate system of the apparatus, the apparatus maps the at least three first position points to the two-dimensional coordinate system, a maximum x value is regarded as a maximum x value of the first position area, a minimum x value is regarded as a minimum x value of the first position area, a maximum y value is regarded as a maximum y value of the first position area, and a minimum y value is regarded as a minimum y value of the first position area, so as to determine a range of the first position area.

For instance, three coordinates are (2, 3), (4, 5), (3, 7), thus the maximum x value of the first position area is 4, the minimum x value of the first position area is 2, the maximum y value of the first position area is 7, and minimum y value of the first position area is 3.

At block S2043, determining whether the second central point is in the first position area. If the second central point is determined in the first position area, the procedure goes to block S2044, if the second central point is not determined in the first position area, the procedure goes to block S2047.

In at least one embodiment, the apparatus determines whether the coordinate of the second central point is in the first position area.

At block S2044, determining distances between the second central point and each of the at least three second position points and the first central point.

In at least one embodiment, if the second central point is in the first position area, based on an formula $d=\sqrt{(x-x_0)^2+(y-y_0)^2}$, calculating distances between the second central point and each of the at least three second position points and the first central point.

For instance, the distances between the at least three second position points and the second central point are determined in block S2041, and the first central point determined in block S2023 may be:

$$R1 = \sqrt{\left(Sx1 - \frac{Fx1+Fx2+Fx3}{3}\right)^2 + \left(Sy1 - \frac{Fy1+Fy2+Fy3}{3}\right)^2},$$

$$R2 = \sqrt{\left(Sx2 - \frac{Fx1+Fx2+Fx3}{3}\right)^2 + \left(Sy2 - \frac{Fy1+Fy2+Fy3}{3}\right)^2},$$

$$R3 = \sqrt{\left(Sx3 - \frac{Fx1+Fx2+Fx3}{3}\right)^2 + \left(Sy3 - \frac{Fy1+Fy2+Fy3}{3}\right)^2},$$

$$R4 = \sqrt{\left(\frac{Sx1+Sx2+Sx3}{3} - \frac{Fx1+Fx2+Fx3}{3}\right)^2 + \left(\frac{Sy1+Sy2+Sy3}{3} - \frac{Fy1+F\ldots}{\ldots}\right)}$$

At block S2045, determining a position point closest to the first central point.

In at least one embodiment, the apparatus compares the calculated distances, and determines a position point corresponding to the smallest distance.

At block S2046, determining the closest position point as the actual position of the apparatus.

For instance, if R1 is smaller than R2, R3, R4, the apparatus determines the longitude and latitude corresponding to the position point of R1 as the actual position of the apparatus. R1 is a distance between the base station 1 and the first central point, R2 is a distance between the base station 2 and the first central point, R3 is a distance between the base station 3 and the first central point, and R4 is a distance between the second central point and the first central point.

Figure 9:
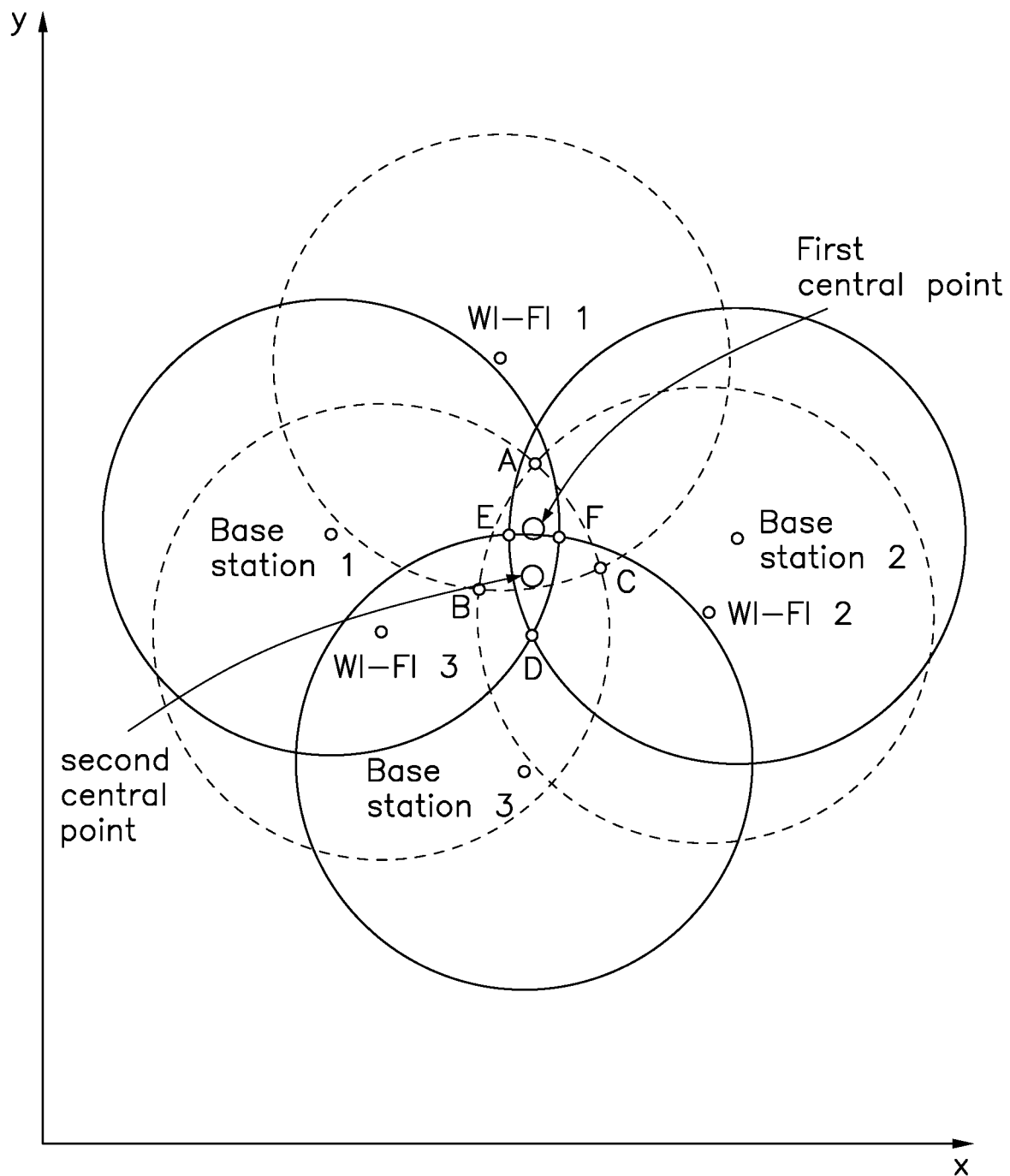
FIG. 9 illustrates a schematic view of at least one embodiment of actual positioning results of an apparatus.

Referring to FIG. 9, a central point of the area enclosed by the three positioning points A, B, C of the WI-FI positioning result is the first central point, a central point of the area enclosed by the three positioning points D, E, F of the base station positioning result is the second central point. Since the second central point of the base station positioning result is the closest to the first central point of the WI-FI positioning result, so the second central point of the base station positioning result is determined to be the actual position of the apparatus.

At block S2047, determining the second central point as the actual position of the apparatus.

In at least one embodiment, if the second central point is not in the first position area, the apparatus determines the second central point as the actual position of the apparatus.

For instance, if (Sx1+Sx2+Sx3)/3 is smaller than a minimum value of Fx1, Fx2, Fx3 or greater than a maximum of Fx1, Fx2, Fx3, thus the second central point is not in the first position area, the apparatus determines the longitude and latitude corresponding to the coordinate of the position point R4 as the actual position of the apparatus.

Figure 10:
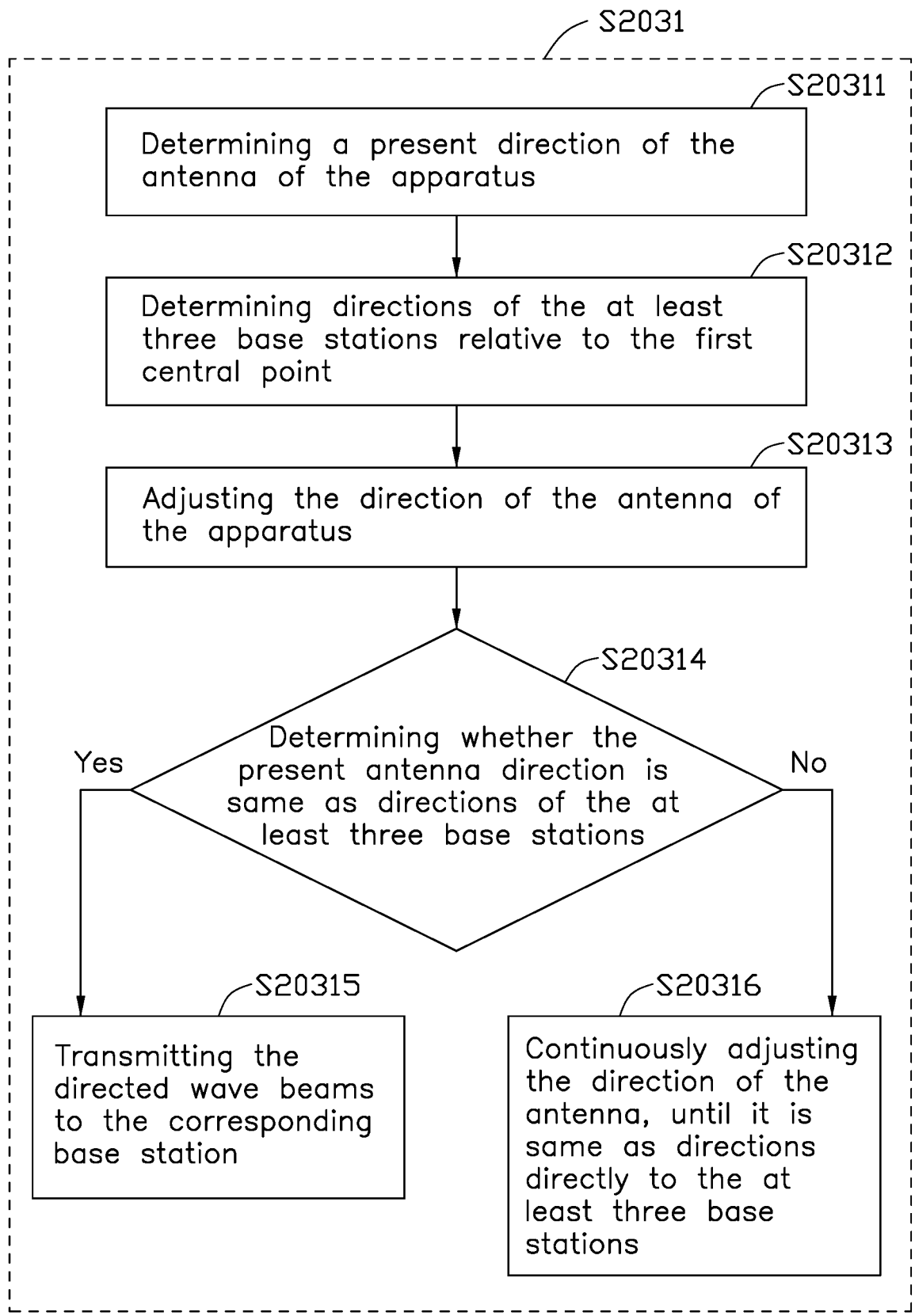
FIG. 10 is a sixth flowchart of at least one embodiment of the method for indoor positioning.

For transmitting the directed wave beams to the at least three base stations, as shown in FIG. 10, block S2031 further includes blocks S20311-S20315.

At block S20311, determining a present direction of the antenna of the apparatus.

In at least one embodiment, the apparatus obtains compass bearing of its antenna, and determines the present direction of the antenna of the apparatus. The compass information shows a direction of the apparatus, which is corresponding to the direction of the antenna.

At block S20312, determining directions of the at least three base stations relative to the first central point.

In at least one embodiment, in the two-dimensional coordinate system of the apparatus, the apparatus regards a positive direction of Y-axis as due north, and determines the directions of the at least three base stations relative to the first central point.

At block S20313, adjusting the direction of the antenna of the apparatus.

In at least one embodiment, the apparatus adjusts a relative phase difference between two adjacent antenna elements of the antenna, so the wave beams transmitted by the antenna are directional, so as to adjust the direction of the antenna of the apparatus.

Figure 11:
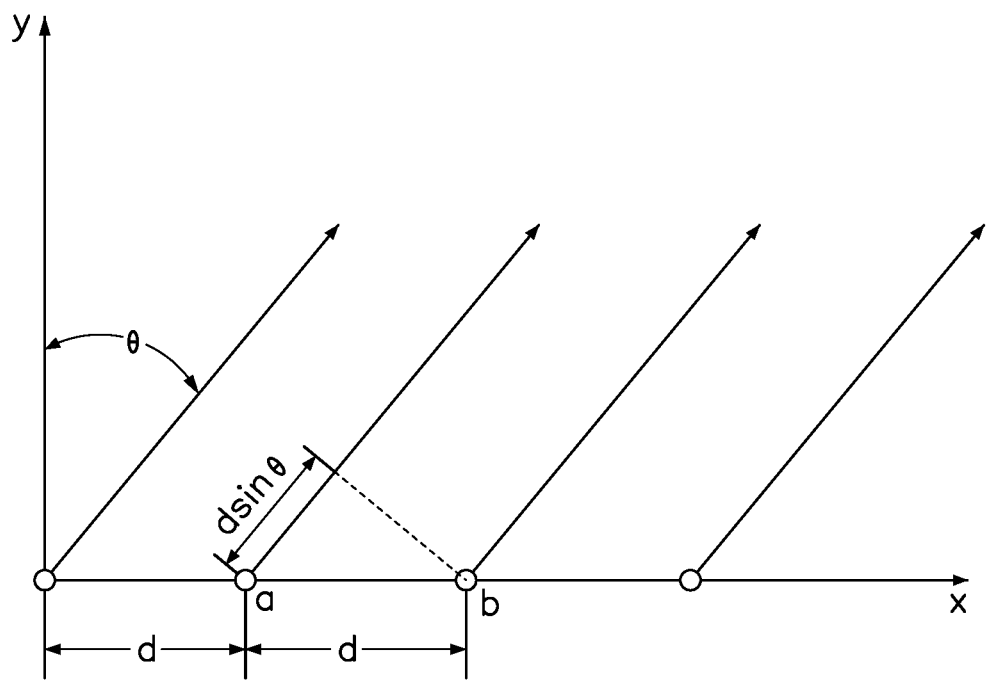
FIG. 11 illustrates a schematic view of at least one embodiment of an antenna element.

Referring to FIG. 11, there are several antenna elements in the horizontal axis, a distance d is formed between every two antenna elements, an angle θ is formed between a main direction (the Y-axis direction in FIG. 11) of the transmitting signal of the antenna and a connecting direction of the antenna elements, a time difference of the transmitting signals by adjacent element a and element b is $$\tau = \frac{d*\sin\theta}{c},$$

a phase difference between the element a and element b is $$\Delta\phi = \omega * \frac{d*\sin\theta}{c}.$$

Substitute $\Delta\omega=2\pi f$ and $$f = \frac{c}{\lambda}$$

into the phase difference equation to obtain $$\Delta\phi = 2\pi\frac{c}{\lambda} * \frac{d*\sin\theta}{c} = \frac{2\pi}{\lambda}*d\sin\theta.$$

If $$d = \frac{\lambda}{2},$$

thus, $\Delta\phi=\pi \sin \theta$, the apparatus may control the transmitting direction of the antenna by controlling $\Delta\phi$, so as to adjust the direction of the antenna of the apparatus. For instance, adjusting the phase difference $\Delta\phi$ by 0, so it's a 0 degree angle of the transmitting direction of the antenna relative to the Y-axis. Adjusting the phase difference $\Delta\phi$ by $\pi/2$, so it's a 30 degree angle of the transmitting direction of the antenna relative to the Y-axis. Adjusting the phase difference $\Delta\phi$ by $\pi$, so it's a 90 degree angle of the transmitting direction of the antenna relative to the Y-axis.

At block S20314, determining whether the present antenna direction is same as directions of the at least three base stations.

In at least one embodiment, the apparatus compares the transmitting direction of the antenna relative to the Y-axis with a direction of the line between the three base stations and the first central point relative to the Y-axis, to determine whether the present antenna direction is same as directions of the at least three base stations.

At block S20315, if the present antenna direction is same as directions straight to the at least three base stations is determined, transmitting the directed wave beams to the corresponding base station.

In at least one embodiment, if the present antenna direction is same as directions of the at least three base stations is determined, the apparatus controls the antenna to transmit the directed wave beams to the corresponding base station.

At block S20316, if the present antenna direction is not same as directions of the at least three base stations, the apparatus continuously adjusts the direction of the antenna, until it is same as directions directly to the at least three base stations.

Figure 12:
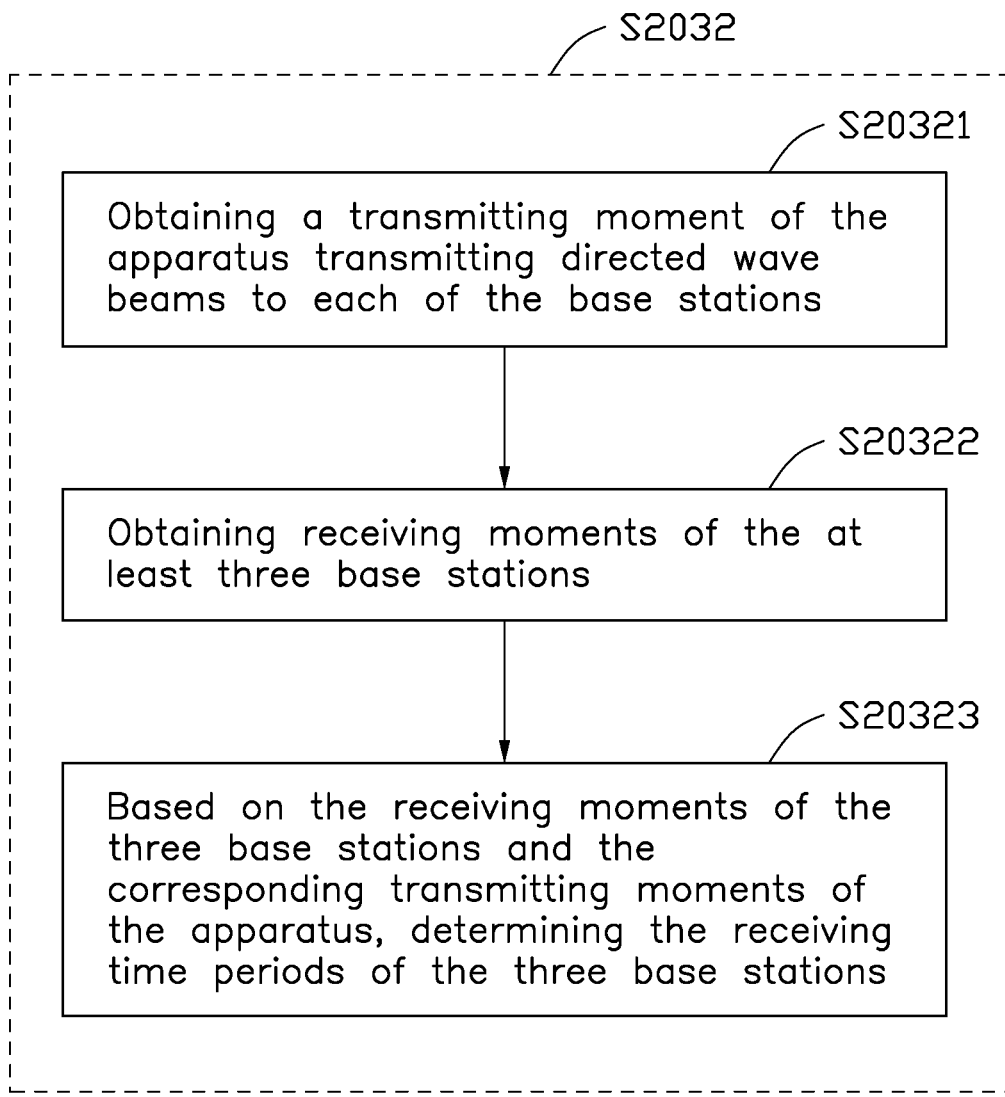
FIG. 12 is a seventh flowchart of at least one embodiment of the method for indoor positioning.

In at least one embodiment, for determining receiving time periods of the at least three base stations, as shown in FIG. 12, block S2032 further includes blocks S20321-S20323.

At block S20321, obtaining a transmitting moment of the apparatus transmitting directed wave beams to each of the base stations.

After the apparatus transmitted directed wave beams to each of the base stations, the apparatus stores the base station identifiers and the corresponding transmitting moments to a memory thereof.

In at least one embodiment, the apparatus may obtain the transmitting moments of the apparatus transmitting the directed wave beams to each of the base stations.

At block S20322, obtaining receiving moments of the at least three base stations.

When the base stations receive the directed wave beams transmitted by the apparatus, the base stations transmit the receiving moments of the directed wave beams to the apparatus. The apparatus receives the receiving moments from the base stations and stores the base station identifiers and the corresponding transmitting moments to the memory.

In other embodiments, receiving time periods of the three base stations may be a half of time differences between the receiving moments of each base station and the transmitting moment of the apparatus. The receiving time periods of the three base stations are unlimited by the present disclosure.

In at least one embodiment, the apparatus may obtain the receiving moments of the three base stations from the memory.

At block S20323, based on the receiving moments of the three base stations and the corresponding transmitting moments of the apparatus, determining the receiving time periods of the three base stations.

In at least one embodiment, based on the time difference between the receiving moment of the base station and the transmitting moment of the apparatus in the same base station identifier, determining the receiving time periods of the three base stations.

For instance, the transmitting moment of the apparatus is Tt1, the receiving moment of the base station 1 is Rr1, so the receiving time period of the base station 1 is t1=Rr1−Tt1.

The method for indoor positioning obtains the WI-FI positioning result including the first position information, so as to obtain a preliminary indoor positioning result of the apparatus. Then, the method determines and selects at least three base stations according to the WI-FI positioning result and determines the base station positioning result of the apparatus according to the at least three base stations, the base station positioning result includes the second position information. Last but not least, the method determines the position of the apparatus according to the WI-FI positioning result and the base station positioning result. Thus, the precision of the actual indoor positioning of the apparatus is improved, meanwhile no extra WI-FI transmitting devices and outdoor base stations are needed, decreasing the cost.

Figure 13:
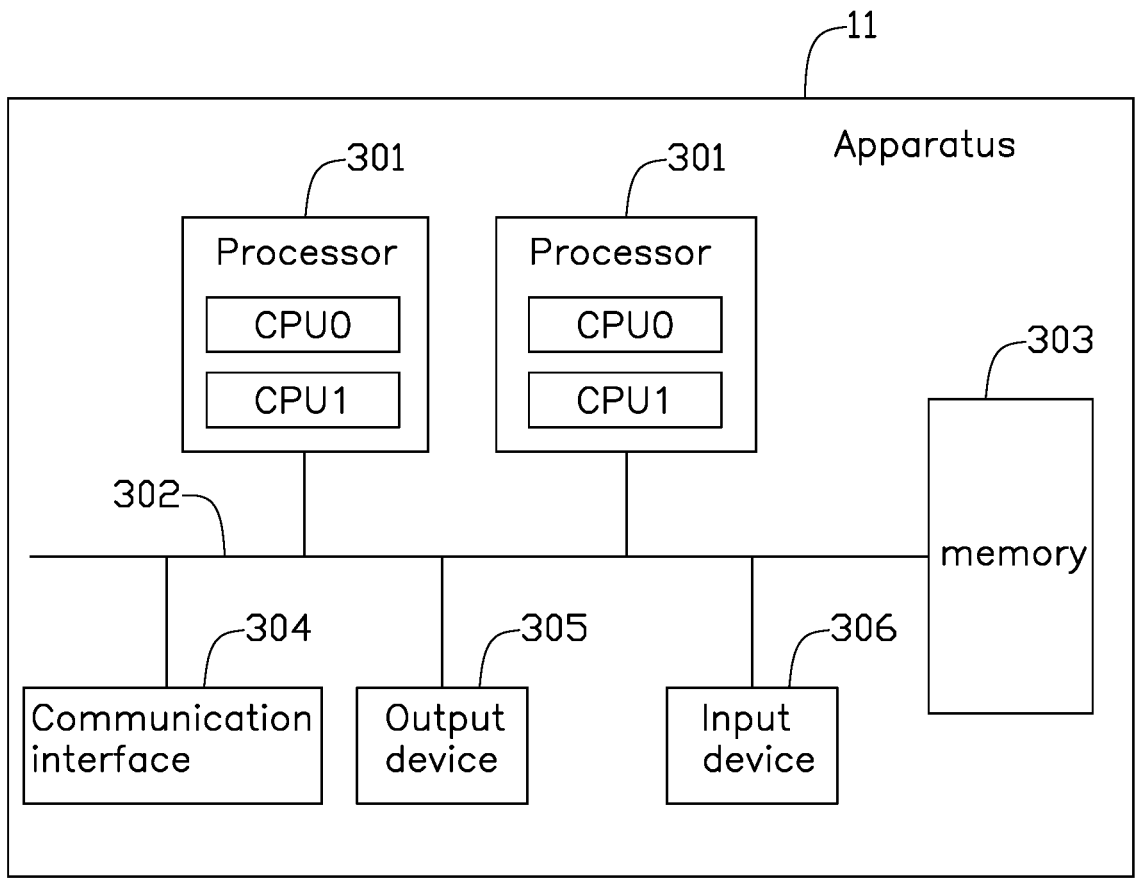
FIG. 13 illustrates a schematic view of at least one embodiment of the apparatus.

FIG. 13 illustrates a schematic view of at least one embodiment of the apparatus 11 for indoor positioning and applying the method for indoor positioning as shown in FIG. 2. The apparatus 11 includes at least one processor 301, a communication bus 302, a memory 303, and at least one communication interface 304.

The apparatus 11 can be divided into one or more elements/modules, such as the elements shown in FIG. 13, the one or more elements/modules are stored in the memory 303 and can be run by the at least one processor 301 to perform the method for indoor positioning. The one or more elements/modules can be computer program instructions describing a perform process of the method for indoor positioning.

In at least one embodiment, the apparatus 11 for indoor positioning can be any electronic devices, such as personal computers, tablet computers, smart phones, personal digital assistants (PDAs), etc. A structure of the apparatus 11 for indoor positioning is not limited to that shown in FIG. 11, the apparatus 11 for indoor positioning can be in bus configuration or in star configuration. The apparatus 11 for indoor positioning can include more hardware, software, and other necessary elements.

The at least one processor 301 is configured to perform the method for indoor positioning. In at least one embodiment, the at least one processor 301 can be formed by integrated circuits, such as an individual integrated circuit or multiple integrated circuits with a same function or different functions. The at least one processor 301 includes, but is not limited to, a central processing unit (CPU), a microprocessor, a digital signal processor (DSP), a graphics processor, an application specific integrated circuit (ASIC), a field-programmable gate array (FPGA), a data processor chip, a programmable logic device (PLD), a discrete gate/transistor logic device, or a discrete hardware component. The at least one processor 301 may be a control unit and electrically connected to other elements of the apparatus 11 through interfaces or the communication bus 302. In at least one embodiment, the various types of non-transitory computer-readable storage mediums stored in the memory 303 can be processed by the at least one processor 301 to perform various of functions, such as the method for indoor positioning.

In at least one embodiment, the memory 303 can include various types of non-transitory computer-readable storage mediums. For example, the memory 303 can store local paths and computer instructions of the method for indoor positioning. The memory 303 can rapidly and automatically access instructions and data when the apparatus 11 is running. The memory 303 can be an internal storage system, such as a flash memory, a Random Access Memory (RAM) for the temporary storage of information, and/or a Read-Only Memory (ROM), a Programmable Read-Only Memory (PROM), Erasable Programmable Read-Only Memory (EPROM), a One-time Programmable Read-Only Memory (OTPROM), Electrically-Erasable Programmable Read-Only Memory (EEPROM), Compact Disc Read-Only Memory (CD-ROM) for permanent storage of information. The memory 303 can also be an external storage system, such as a hard disk, a storage card, or a data storage medium.

The communication bus 302 includes a communication path for communicating the other elements and modules.

The communication interface 304 includes a transceiver for communicating with other devices through communicate networks, such as Ethernet, radio access network (RAN), wireless local area networks (WLAN), etc.

In at least one embodiment, the processor 301 includes one or more CPU, such as CPU0 and CPU1 as shown in FIG. 13.

The apparatus 11 may include several processors which may be same or different. The processor 301 may be a single-CPU processor or multi-CPU processor.

The apparatus 11 may further include an output device 305 and an input device 306 connected to the processor 301. The output device 305 may display information. The output device 305 may be a liquid crystal display (LCD), a light emitting diode (LED) display device, a cathode ray tube (CRT) display device, a projector, etc. The input device 306 may receive input operations from the user. The input device 306 may be a mouse, a keyboard, a touch screen, a sensitive device, etc.

A non-transitory computer-readable storage medium including program instructions for causing the apparatus to perform the method for indoor positioning is also disclosed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method for indoor positioning comprising:
   obtaining a WI-FI positioning result of an apparatus, the WI-FI positioning result comprising first position information of the apparatus, the first position information comprising information of at least three first position points;
   determining at least three base stations according to the WI-FI positioning result;
   determining a base station positioning result of the apparatus according to the at least three base stations, the base station positioning result comprising second position information of the apparatus, the second position information comprising information of at least three second position points; and
   determining an actual position of the apparatus according to the first position information and the second position information;
   wherein the determining at least three base stations according to the WI-FI positioning result comprises:
   determining position information of a first central point corresponding to the information of at least three first position points;
   wherein the determining the actual position of the apparatus according to the first position information and the second position information comprises:
   determining position information of a second central point corresponding to the information of at least three second position points;
   determining a first position area according to the information of at least three first position points;
   determining whether the second central point is in the first position area;
   if the second central point being in the first position area is determined, determining distances between the second central point and each of the at least three second position points and the first central point;
   determining a position point closest to the first central point;
   determining the closest position point as the actual position of the apparatus; and
   if the second central point being not in the first position area is determined, determining the second central point as the actual position of the apparatus.

2. The method according to claim 1, wherein the determining at least three base stations according to the WI-FI positioning result further comprises:
   obtaining position information of a predetermined quantity of base stations, the position information of the base stations comprises a base station identifier and a position corresponding to the base station identifier, the predetermined quantity is greater than or equal to three;

based on the position information of the first central point and the position information of the predetermined quantity of base stations, determining distances between the first central point and the predetermined quantity of base stations;

determining at least three base station identifiers with a least distance; and determining the at least three base stations according to the at least three base station identifiers.

3. The method according to claim 2, wherein the determining at least three base stations according to the WI-FI positioning result comprises:

transmitting directed wave beams to the at least three base stations respectively, and determining receiving time periods of the at least three base stations, the receiving time periods mean a transmitting time period of the directed wave beams transmitted from the apparatus to the at least three base stations;

based on the receiving time periods of the at least three base stations, determining distances between the apparatus and the at least three base stations; and based on the distances between the apparatus and the at least three base stations and positions of the at least three base stations, determining the base station positioning result of the apparatus.

4. The method according to claim 3, wherein the based on the distances between the apparatus and the at least three base stations and positions of the at least three base stations, determining the base station positioning result of the apparatus comprises:

regarding the positions of the at least three base stations as centers of circles, and regarding distances of the at least three base stations as radiuses, to generate spherical functions corresponding to the at least three base stations; and based on the spherical functions, determining the base station positioning result of the apparatus.

5. The method according to claim 3, wherein the transmitting the directed wave beams to the at least three base stations comprises:

determining directions of the at least three base stations relative to the first central point;

adjusting a direction of the antenna of the apparatus; and if the direction of the antenna of the apparatus is the same as one of the directions of the at least three base stations, transmitting the directed wave beams in the direction of the antenna of the apparatus to the corresponding base station.

6. The method according to claim 5, wherein the adjusting the direction of the antenna of the apparatus comprises:

adjusting a relative phase difference between two adjacent antenna elements of the antenna; and adjusting the direction of the antenna of the apparatus according to the relative phase difference.

7. The method according to claim 3, wherein the determining receiving time periods of the at least three base stations comprises:

obtaining a transmitting moment of the apparatus transmitting the directed wave beams to each of the at least three base stations;

obtaining receiving moments of the at least three base stations; and based on the receiving moments of the at least three base stations and the corresponding transmitting moments of the apparatus, determining the receiving time periods of the at least three base stations.

8. An apparatus for indoor positioning comprising:

at least one processor; and at least one memory coupled to the at least one processor and storing program instructions;

the at least one memory and the program instructions configured to, with the at least one processor, cause the apparatus to perform:

obtaining a WI-FI positioning result of an apparatus, the WI-FI positioning result comprising first position information of the apparatus, the first position information comprising information of at least three first position points;

determining at least three base stations according to the WI-FI positioning result;

determining a base station positioning result of the apparatus according to the at least three base stations, the base station positioning result comprising second position information of the apparatus, the second position information comprising information of at least three second position points; and determining an actual position of the apparatus according to the first position information and the second position information;

wherein the determining at least three base stations according to the WI-FI positioning result comprises:

determining position information of a first central point corresponding to the information of at least three first position points;

wherein the determining the actual position of the apparatus according to the first position information and the second position information comprises:

determining position information of a second central point corresponding to the information of at least three second position points;

determining a first position area according to the information of at least three first position points;

determining whether the second central point is in the first position area;

if the second central point being in the first position area is determined, determining distances between the second central point and each of the at least three second position points and the first central point;

determining a position point closest to the first central point;

determining the closest position point as the actual position of the apparatus; and if the second central point being not in the first position area is determined, determining the second central point as the actual position of the apparatus.

9. The apparatus according to claim 8, wherein the determining at least three base stations according to the WI-FI positioning result further comprises:

obtaining position information of a predetermined quantity of base stations, the position information of the base stations comprises a base station identifier and a position corresponding to the base station identifier, the predetermined quantity is greater than or equal to three;

based on the position information of the first central point and the position information of the predetermined quantity of base stations, determining distances between the first central point and the predetermined quantity of base stations;

determining at least three base station identifiers with a least distance; and determining the at least three base stations according to the at least three base station identifiers.

10. The apparatus according to claim 9, wherein the determining at least three base stations according to the WI-FI positioning result comprises:
transmitting directed wave beams to the at least three base stations respectively, and determining receiving time periods of the at least three base stations, the receiving time periods mean a transmitting time period of the directed wave beams transmitted from the apparatus to the at least three base stations;
based on the receiving time periods of the at least three base stations, determining distances between the apparatus and the at least three base stations; and
based on the distances between the apparatus and the at least three base stations and positions of the at least three base stations, determining the base station positioning result of the apparatus.

11. The apparatus according to claim 10, wherein the based on the distances between the apparatus and the at least three base stations and positions of the at least three base stations, determining the base station positioning result of the apparatus comprises:
regarding the positions of the at least three base stations as centers of circles, and regarding distances of the at least three base stations as radiuses, to generate spherical functions corresponding to the at least three base stations; and
based on the spherical functions, determining the base station positioning result of the apparatus.

12. The apparatus according to claim 10, wherein the transmitting the directed wave beams to the at least three base stations comprises:
determining directions of the at least three base stations relative to the first central point;
adjusting a direction of the antenna of the apparatus; and
if the direction of the antenna of the apparatus is the same as one of the directions of the at least three base stations, transmitting the directed wave beams in the direction of the antenna of the apparatus to the corresponding base station.

13. The apparatus according to claim 12, wherein the adjusting the direction of the antenna of the apparatus comprises:
adjusting a relative phase difference between two adjacent antenna elements of the antenna; and
adjusting the direction of the antenna of the apparatus according to the relative phase difference.

14. The apparatus according to claim 10, wherein the determining receiving time periods of the at least three base stations comprises:
obtaining a transmitting moment of the apparatus transmitting the directed wave beams to each of the at least three base stations;
obtaining receiving moments of the at least three base stations; and
based on the receiving moments of the at least three base stations and the corresponding transmitting moments of the apparatus, determining the receiving time periods of the at least three base stations.

15. A non-transitory computer readable medium comprising program instructions for causing an apparatus to perform at least the follow:
obtaining a WI-FI positioning result of an apparatus, the WI-FI positioning result comprising first position information of the apparatus, the first position information comprising information of at least three first position points;
determining at least three base stations according to the WI-FI positioning result;
determining a base station positioning result of the apparatus according to the at least three base stations, the base station positioning result comprising second position information of the apparatus, the second position information comprising information of at least three second position points; and
determining an actual position of the apparatus according to the first position information and the second position information;
wherein the determining at least three base stations according to the WI-FI positioning result comprises:
determining position information of a first central point corresponding to the information of at least three first position points;
wherein the determining the actual position of the apparatus according to the first position information and the second position information comprises:
determining position information of a second central point corresponding to the information of at least three second position points;
determining a first position area according to the information of at least three first position points;
determining whether the second central point is in the first position area;
if the second central point being in the first position area is determined, determining distances between the second central point and each of the at least three second position points and the first central point;
determining a position point closest to the first central point;
determining the closest position point as the actual position of the apparatus; and
if the second central point being not in the first position area is determined, determining the second central point as the actual position of the apparatus.

* * * * *